United States Patent [19]
Detwiler et al.

[11] 3,867,036
[45] Feb. 18, 1975

[54] LIMIT DISPLAY CIRCUIT FOR RADIATION SOURCE ANALYSIS

[75] Inventors: Grant R. Detwiler, Orange; Ronald E. Chastain, Tustin, both of Calif.

[73] Assignee: The United States of America as represented by the Secretary of the Army, Washington, D.C.

[22] Filed: Apr. 30, 1974

[21] Appl. No.: 465,722

[52] U.S. Cl................. 356/121, 250/237, 356/218
[51] Int. Cl.......... G01j 1/00, G01j 1/42, H01j 3/14
[58] Field of Search................... 356/121, 222, 218; 250/237

[56] References Cited
UNITED STATES PATENTS

| | | | |
|---|---|---|---|
| 2,651,963 | 9/1953 | Bischoff | 356/121 |
| 3,698,815 | 10/1972 | Thomas | 356/121 |
| 3,706,498 | 12/1972 | Peacher | 356/121 |

*Primary Examiner*—Eli Lieberman
*Assistant Examiner*—T. N. Grigsby
*Attorney, Agent, or Firm*—Edward J. Kelly; Herbert Berl; Jack W. Voigt

[57] ABSTRACT

A limit display circuit is disclosed having intensity and positional encoding sensors disposed for sampling radiant energy across the path of a light beam. The limit display circuit allows continuous radiant intensity level measurements of optical energy across the surface of a beam and simultaneously provides a precise limit function output from selected programmable points across the beam surface during traversal of optical sensors across the surface. Outputs of the sensors are amplified and coupled to an oscilloscope for display.

3 Claims, 3 Drawing Figures

PATENTED FEB 18 1975　　　　　　　　　　　　　　　　　　3,867,036

LIMIT DISPLAY CIRCUIT FOR RADIATION SOURCE ANALYSIS

SUMMARY OF THE INVENTION

The limit display circuit allows display and recording of radiant intensity along a line across a cross section of the beam while allowing the beam source to remain stationary. Energy distribution across the face of the beam is continuously sampled and compared with a precise limit function displayed on an oscilloscope for adjusting the beam intensity distribution or for conformance of the beam to specified limits. Selected limit levels are coupled from a scaling power supply to a switching circuit for selective coupling to the oscilloscope for comparison with the product generated function representative of the optical beam being measured. The selected voltage levels are sequentially coupled to the oscilloscope by a counter circuit activated by a clock pulse generator which is responsive to position indicators indicating traversal of optical sensors across the face of the beam.

DESCRIPTION OF THE PREFERRED EMBODIMENT

Figure 1:
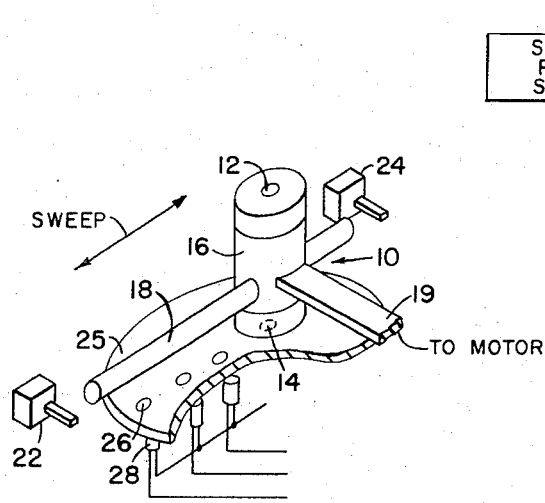
FIG. 1 is a simplified diagrammatic view illustrating the limit display circuit apparatus with extraneous structure omitted.

Referring now to the drawings wherein like numbers represent like parts in the several views, FIG. 1 discloses a simplified diagrammatic view of a radiometer 10 for measuring radiant optical energy. Radiometer 10 includes a pair of photocell sensors 12 and 14 at opposing ends thereof. Sensors 12 and 14 are coaxially mounted and disposed respectively within or below the surface plane of the end of support member 16 for responding only to optical energy impinging substantially normally thereto. A shaft 18 supports radiometer 10 and allows for linear movement of the radiometer along the shaft. A moveable arm 19 is attached between radiometer support housing 16 and a control motor (not shown) for moving the radiometer back and forth along the line of movement provided by shaft 18. Limit switches 22 and 24 are disposed at the respective ends of shaft 18 for mechanically contacting the moveable radiometer 10 at the preselected limit of traversal of the radiometer to either end and terminating or reversing the direction of movement as desired. Electrical outputs (as noted in FIG. 2) from the limit switches are coupled to provide the controlling signals for continuously traversing the radiometer along the axis of movement and periodically activating the monitoring circuitry in a manner as well established in the prior art. A large apertured plate 25 is disposed beneath radiometer 10, adjacent to and parallel with the surface containing photocell 14. Apertures 26 are disposed in plate 24 at periodic intervals along a line in a plane passing through support shaft 18, photocell 14 and apertures 26 so that photocell 14 periodically is positioned over respective individual apertures. Lamps 28 are positioned beneath respective apertures 26 for providing optical energy through the apertures to impinge on photocell 14 as the photocell passes over individual apertures.

Figure 2:
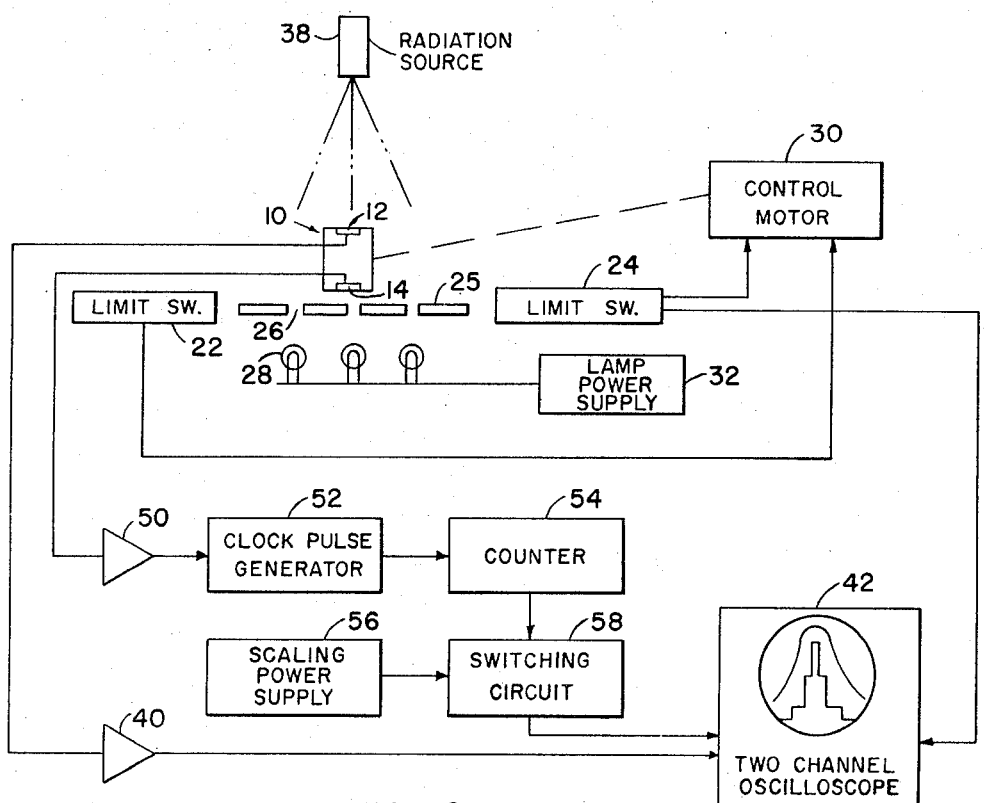
FIG. 2 is a block diagram of a preferred embodiment of the limit display circuit.

As shown in FIG. 2 radiometer 10 is driven back and forth along the sweep axis of shaft 18 by control motor 30. Lamps 28 are coupled to a lamp power supply 32. All lamps are illuminated. Limit switch 22 and limit switch 24 have electrical outputs coupled to control motor 30 for allowing the control motor to reverse its drive at the respective ends of shaft 18 and thereby repeatedly drive radiometer 10 through the radiant light beam in the particular area of interest. Radiation from a radiation source 38 continuously impinges on photocell 12 during traversal of the photocell along the sweep axis. An electrical signal is coupled from photocell 12 to a preamplifier 40. This signal, indicative of the intensity of the optical energy, is amplified and coupled to one of the input channels of a two channel oscilloscope 42. Simultaneously, as the radiometer 10 moves along aperture plate 25, photocell 14 is periodically activated coupling a representative electrical signal to preamplifier 50. This signal is amplified and coupled to a clock pulse generator 52. In response to the amplified input signal pulse generator 52 provides an output pulse to a counter circuit 54. A scaling power supply 56 and counter 54 have outputs coupled to a switching circuit 58. Switching circuit 58 responds to the input from counter 54 to couple selected voltages from scaling power supply 56 as step inputs to the second channel of oscilloscope 42.

Figure 3:
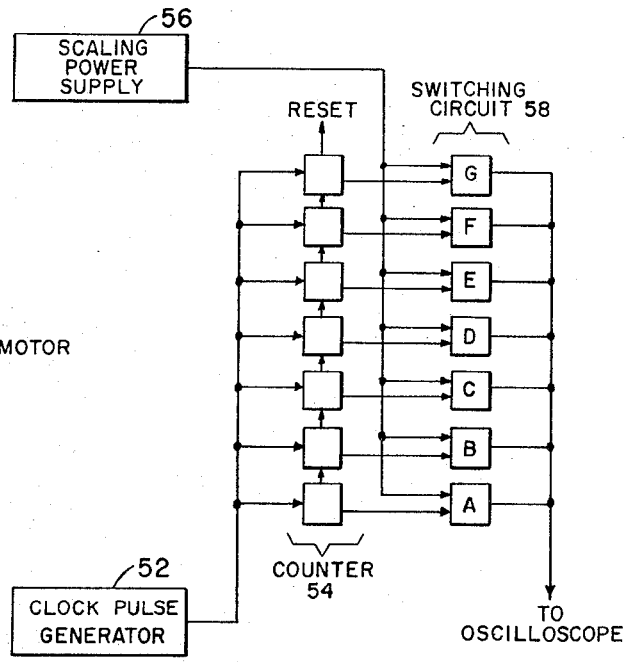
FIG. 3 is a more detailed block diagram of the scaling circuit of the system.

In FIG. 3 scaling power supply 56 is shown to have outputs coupled to respective electronic switches A-G of switching circuit 58. As clock pulse generator 52 periodically or sequentially steps counter 54 through respective stages, the counter sequentially activates switches A-G, allowing the switches to sequentially couple their respective voltages to oscilloscope 42. For the particular embodiment of FIG. 3, counter 54 has seven stages and switching circuit 58 has seven stages. Assuming the beam from radiant source 38 to have minimum intensity at the edges and a maximum intensity at the center with uniform distribution therebetween, the stepped output voltage from scaling power supply 56 can be selected to approximate points along the curve representative of the optical signal. Thus, for example the voltages coupled to switches A and G would be the least voltages coupled from scaling power supply 56 and would be identical. Similarly, the voltages coupled to B and F would be identical and would be higher voltages. The voltages coupled to C and E would be identical and would be higher voltages. The voltage coupled to switch D would be the highest representing the center or peak voltage of the limit function.

During operation, as the radiometer 10 is swept across the radiant light beam in the area of interest, photocell 12 detects the radiation from the source and couples it ultimately to oscilloscope 42 for display. As the radiometer moves from one edge of the beam toward the center, energy from light 28 periodically activates photocell 14 at selected points along the sweep path, which in turn activates pulse generator 52 and counter 54. As counter 54 sequentially activates switches A-G of switching circuit 58 the output voltage coupled to the oscilloscope 42 is stepped up from a minimum level output from switch A to a maximum level output from switch D and back to a minimum level output from switch G. Thus the clock pulse, which represents a precise time and position location, is used to switch the various preset voltage limit levels which make up the limit function supplied by scaling power supply 56 to switching circuit 58. This function may be typical of the desired specified limits of beam intensity across the beam for the particular radiation source. The curve or function generated by the radiation source is then compared on the oscilloscope with the precise limit function. Typically, this comparison discloses conformance of the radiation source to specified limits and may provide a basis for acceptance or rejection of the source 38.

A trigger input from limit switch 24 to oscilloscope 42 indicates beginning of the recurring radiometer sweep across the light beam. Obviously, both limit switches may be coupled to the oscilloscope to provide a single trace after each individual scan across the beam if desired.

Obviously various modifications and variations of the present invention are possible in light of the above disclosure. It is, therefore, to be understood that within the scope of the appended claims, the invention may be practiced otherwise than as specifically disclosed herein.

We claim:

1. A limit display circuit for comparing optical radiated energy with a precise limit function, comprising: a radiation source, an apertured plate having respective apertures selectively disposed along a straight line, detector means disposed for controlled movement adjacent said plate and between said source and said plate, said detector means having a first sensor responsive to radiant energy from said source and a second sensor responsive to radiant energy impinging on the opposite surface of said plate when precisely positioned adjacent respective apertures therein for providing first and second electrical output signals, and an oscilloscope coupled to said first and second sensors and responsive thereto for simultaneously indicating signals coupled therefrom.

2. A limit display circuit as set forth in claim 1 and further comprising: a counter circuit having an input and an output, a clock pulse generator having an input and having an output coupled to said counter input, a preamplifier coupled between said second sensor and said pulse generator input, a switching circuit coupled between said counter output and a first input of said oscilloscope for sequentially coupling selected step voltages thereto in response to optical energy sequentially impinging on said second sensor, and a scaling power supply coupled to said switching circuit for providing plural selective voltages thereto.

3. A limit display circuit as set forth in claim 2 and further comprising a preamplifier coupled between said first sensor and said oscilloscope for providing an amplified output to the oscilloscope, and control means connected to said detector for directing detector sweeps across the radiant light beam, said control means including a control motor for driving said detector and first and second limit switches for terminating and reversing traversal of said detector at preselected positions along the detectors path.

* * * * *